United States Patent
Liu et al.

(10) Patent No.: US 8,406,827 B2
(45) Date of Patent: Mar. 26, 2013

(54) HOUSING FOR ELECTRONIC DEVICE AND METHOD FOR MAKING THE SAME

(75) Inventors: Yue-Ping Liu, Shenzhen (CN); Hsiang-Jung Su, Taipei Hsien (TW); Wen-Te Lai, Taipei Hsien (TW); You-Li Liu, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 240 days.

(21) Appl. No.: 12/813,613

(22) Filed: Jun. 11, 2010

(65) Prior Publication Data

US 2011/0120743 A1    May 26, 2011

(30) Foreign Application Priority Data

Nov. 20, 2009   (CN) .......................... 2009 1 0310134

(51) Int. Cl.
*H04M 1/00* (2006.01)
*B32B 15/00* (2006.01)

(52) U.S. Cl. ..................... 455/575.1; 455/575.8; 428/45; 428/46; 428/195.1

(58) Field of Classification Search .................. 428/210, 428/195.1, 45, 46; 455/575.1, 575.8
See application file for complete search history.

(56) References Cited

U.S. PATENT DOCUMENTS

| | | | |
|---|---|---|---|
| 7,291,444 B2 * | 11/2007 | Yamashiki et al. | 430/284.1 |
| 7,333,839 B2 * | 2/2008 | Hutchison et al. | 455/575.1 |
| 7,830,671 B2 * | 11/2010 | Nuovo | 361/797 |
| 8,185,166 B2 * | 5/2012 | Weber et al. | 455/575.1 |
| 2011/0183091 A1 * | 7/2011 | Zhu et al. | 428/34.6 |
| 2012/0146467 A1 * | 6/2012 | Zhu et al. | 312/223.1 |

* cited by examiner

*Primary Examiner* — Cathy Lam
(74) *Attorney, Agent, or Firm* — Altis Law Group, Inc.

(57) ABSTRACT

A housing for an electronic device is provided. The housing includes a substrate made of a light-transmittable ceramic. The substrate has an outer surface and an opposite inner surface defining at least one recess configured with patterns or symbols. An opaque layer is formed on the inner surface to prevent light penetrating through the substrate except through the at least one recess.

5 Claims, 1 Drawing Sheet

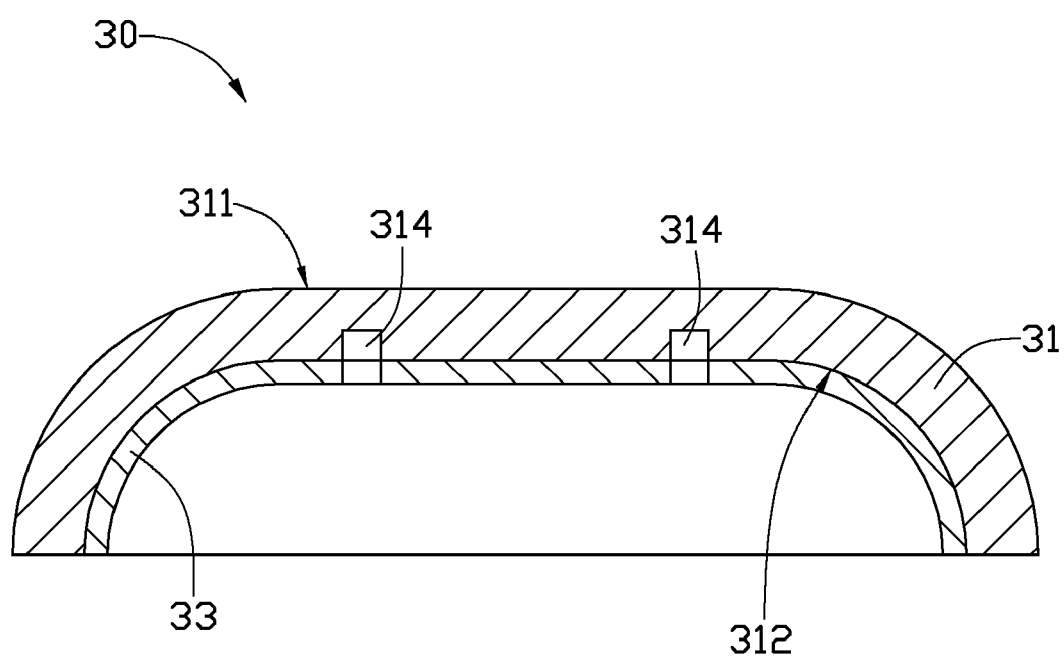

HOUSING FOR ELECTRONIC DEVICE AND METHOD FOR MAKING THE SAME

BACKGROUND

1. Technical Field

The present disclosure relates to a housing for electronic devices and a method for making the housing.

2. Description of Related Art

Nowadays, shells for portable electronic devices are usually decorated with patterns to improve their appearance. Typically, the patterns are directly printed/coated on the exterior surface of the shells. However, once printed/coated, the patterns cannot be changed/altered. Some consumers might find those patterns boring after a period of time.

Therefore, there is room for improvement within the art.

BRIEF DESCRIPTION OF THE DRAWINGS

Many aspects of the present housing for electronic device and method for making the same can be better understood with reference to the drawing. The components in the drawing are not necessarily drawn to scale, the emphasis instead being placed upon clearly illustrating the principles of the present housing for electronic device and method for making the same.

The drawing is a cross sectional view of a shell according to an exemplary embodiment.

DETAILED DESCRIPTION

The drawing shows an exemplary housing 30 for electronic devices (such as mobile phones) including a light-transmittable substrate 31 and a light-tight opaque layer 33.

The substrate 31 has an outer surface 311 and an opposite inner surface 312. The inner surface 312 has at least one recess 314 defined therein. The recess 314 may be designed for aesthetic and/or informative purposes depicting various patterns or symbols. The substrate 31 is made of a light-transmittable ceramic that allows light to pass through. The light-transmittable ceramic can mainly comprise aluminum oxide ($Al_2O_3$), silicon dioxide ($SiO_2$), dichromium trioxide ($Cr_2O_3$), and silicon nitride ($Si_3N_4$). The weight ratio of the aluminum oxide can be about 70%~80%. The weight ratio of the silicon dioxide can be about 10%~20%. The weight ratio of the dichromium trioxide can be about 5%~10%. The weight ratio of the silicon nitride can be about 0.3%~0.6%. In an exemplary embodiment, the weight ratio of the aluminum oxide, silicon dioxide, dichromium trioxide, and silicon nitride can be respectively selected as 76.5%, 16.3%, 6.7%, and 0.5%. Dyes can be mixed in the light-transmittable material to obtain a desired color.

The opaque layer 33 is formed on the inner surface 312 of the substrate 31. The opaque layer 33 covers the inner surface 312 except for any recesses 314, ensuring that the substrate 31 is light-tight except for portions corresponding to the recesses 314. The opaque layer 33 may be comprised of opaque ink or paint.

The electronic device assembled with the housing 30 further includes a plurality of light sources (not shown) below the at least one recess 314 of the housing 30. When the light sources are not lit, the at least one recess 314 is not visible. At this time, the housing 30 has the color of the substrate 31. When the light sources are lit, light from the light sources penetrates the at least one recess 314 to the outside. At this stage, the patterns or symbols constructed by the at least one recess 314 become visible, thus changing the appearance of the device. Therefore, the electronic device can present either one of two different appearances merely by turning on/off the internal light sources.

An exemplary method for making the housing 30 may include the following steps.

A ceramic powder mixture mainly comprising aluminum oxide ($Al_2O_3$), silicon dioxide ($SiO_2$), dichromium trioxide ($Cr_2O_3$), and silicon nitride ($Si_3N_4$) is provided, wherein each component has the weight ratio as described above.

The ceramic powder mixture is mixed with an adhesive to form a paste. The adhesive may be comprised of aldehyde resin and stabilizer. The weight ratio of the adhesive to the paste may be about 5%~3%.

The paste is formed into pellets by, for example, spray granulation. The pellets may have a diameter approximately of about 0.1~0.5 microns with a fluidity that facilitates fully filling the mold in the consequent injection step.

The granulated paste is injected into a mold preheated to 95~105° C. at a pressure of about 20~200 MPa to preform a clay body. The clay body has the same configuration as the substrate 31, including the outer surface 311 and the inner surface 312 defining the at least one recess 314.

The clay body is processed to remove the adhesive. An acid (such as nitric acid) may be used in steam form to break down the adhesive for easy removal from the clay body.

The clay body without the adhesive is sintered at a temperature of about 1000~1200° C. to form the substrate 31. The sintering temperature is 1100° C. in this exemplary embodiment.

The opaque layer 33 is formed on the inner surface 311 besides the recess 314 finishing the manufacturing of the housing 30.

It should be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A housing for electronic device, comprising:
a substrate, the substrate made of a light-transmittable ceramic and having an outer surface and an opposite inner surface, the inner surface defining at least one recess therein, the light-transmittable ceramic mainly comprised of aluminum oxide, silicon dioxide, dichromium trioxide, and silicon nitride, the weight ratio of the aluminum oxide is about 70%~80%, the weight ratio of the silicon dioxide is about 10%~20%, the weight ratio of the dichromium trioxide is about 5%~10%, and the weight ratio of the silicon nitride is about 0.3%~0.6%; and
an opaque layer formed on the inner surface except in areas defining a recess, the opaque layer preventing light penetration through the substrate except for in areas defining a recess.

2. The housing as claimed in claim 1, wherein the weight ratio of the aluminum oxide, silicon dioxide, dichromium trioxide, and silicon nitride are respectively 76.5%, 16.3%, 6.7%, and 0.5%.

3. The housing as claimed in claim 1, wherein the light-transmittable ceramic has dyes mixed therein.

4. The housing as claimed in claim 1, wherein the opaque layer is made of opaque ink or opaque paint.

5. The housing as claimed in claim 1, wherein the at least one recess depicts patterns or symbols.

* * * * *